(12) United States Patent
Lin et al.

(10) Patent No.: US 11,774,150 B2
(45) Date of Patent: Oct. 3, 2023

(54) MOBILE AIR CONDITIONER

(71) Applicant: Midea Group Co., Ltd., Foshan (CN)

(72) Inventors: Chen Lin, Foshan (CN); Hecheng Liu, Foshan (CN); Bao Yue, Foshan (CN)

(73) Assignee: MIDEA GROUP CO., LTD., Foshan (CN)

(*) Notice: Subject to any disclaimer, the term of this patent is extended or adjusted under 35 U.S.C. 154(b) by 308 days.

(21) Appl. No.: 17/112,890

(22) Filed: Dec. 4, 2020

(65) Prior Publication Data

US 2021/0088265 A1 Mar. 25, 2021

Related U.S. Application Data

(63) Continuation of application No. PCT/CN2018/122409, filed on Dec. 20, 2018.

(30) Foreign Application Priority Data

Jun. 12, 2018 (CN) .......................... 201810602380.4

(51) Int. Cl.
*F25B 49/02* (2006.01)
*F25B 41/37* (2021.01)
(Continued)

(52) U.S. Cl.
CPC .............. *F25B 49/02* (2013.01); *F25B 39/00* (2013.01); *F25B 41/31* (2021.01); *F25B 41/37* (2021.01);
(Continued)

(58) Field of Classification Search
CPC .......... F25B 49/02; F25B 41/37; F25B 41/31; F25B 41/40; F25B 39/00; F25B 41/34; F25B 2600/2515; F25B 2700/21
See application file for complete search history.

(56) References Cited

U.S. PATENT DOCUMENTS

| 3,872,687 A * | 3/1975 | Bottum | F25B 40/00 62/503 |
| 2017/0304964 A1* | 10/2017 | Andersen | F28F 7/02 |

FOREIGN PATENT DOCUMENTS

| CN | 2660363 Y | 12/2004 |
| CN | 200986280 Y | 12/2007 |

(Continued)

OTHER PUBLICATIONS

Li, Movable radiation heat exchange device, 2016, Full Document (Year: 2016).*

(Continued)

*Primary Examiner* — Nael N Babaa
(74) *Attorney, Agent, or Firm* — Morgan, Lewis & Bockius LLP

(57) ABSTRACT

A mobile air conditioner, comprising: a first heat exchanger, having a first interface and a second interface for a refrigerant to enter and exit; a phase-change energy storage heat exchange device, including a second heat exchanger and a phase-change energy storage working medium, wherein the second heat exchanger and the phase-change energy storage working medium may exchange heat therebetween, and the second heat exchanger has a third interface and a fourth interface for the refrigerant to enter and exit; a first refrigerant pipeline, connected to the first interface and the third interface; and a second refrigerant pipeline, connected to the second interface and the fourth interface.

18 Claims, 5 Drawing Sheets

(51) Int. Cl.
*F25B 41/31* (2021.01)
*F25B 41/40* (2021.01)
*F25B 39/00* (2006.01)
*F25B 41/34* (2021.01)

(52) U.S. Cl.
CPC .............. *F25B 41/40* (2021.01); *F25B 41/34* (2021.01); *F25B 2600/2515* (2013.01); *F25B 2700/21* (2013.01)

(56) References Cited

FOREIGN PATENT DOCUMENTS

| | | | |
|---|---|---|---|
| CN | 101986051 | A | 3/2011 |
| CN | 202361855 | U | 8/2012 |
| CN | 203671779 | U | 6/2014 |
| CN | 104566649 | A | 4/2015 |
| CN | 104633815 | A | 5/2015 |
| CN | 104896632 | A | 9/2015 |
| CN | 105864907 | A * | 8/2016 |
| CN | 105864907 | A | 8/2016 |
| CN | 106524367 | A | 3/2017 |
| CN | 206338887 | U | 7/2017 |
| CN | 206338899 | U | 7/2017 |
| CN | 207196983 | U | 4/2018 |
| DE | 3938875 | A1 | 5/1991 |
| JP | 2005147623 | A | 6/2005 |
| JP | 2016041987 | A | 3/2016 |
| JP | 2016082797 | A | 5/2016 |
| KR | 100561601 | B1 | 3/2006 |
| KR | 1020100035740 | A | 4/2010 |
| KR | 1020110073764 | A | 6/2011 |
| KR | 1020140087697 | A | 7/2014 |
| WO | WO 2013165535 | A1 | 11/2013 |
| WO | WO2018041529 | A1 | 3/2018 |

OTHER PUBLICATIONS

Midea Group Co., Ltd., Notification of Reason for Refusal, Application No. 10-2020-7025626, dated Aug. 27, 2021, 9 pgs.
Midea Group Co., Ltd., Supplementary Extended European Search Report, EP Application No. 18922915.6, dated Jun. 10, 2021, 10 pgs.
Midea Group Co Ltd, International Search Report and Written Opinion, PCT/CN2018/122409, dated Mar. 22, 2019, 13 pgs.
Midea Group Co Ltd, First Office Action, CN201810602380.4, dated Aug. 26, 2020, 19 pgs.
Midea Group Co Ltd, First Search, CN201810602380.4, Aug. 18, 2020, 5 pgs.
Midea Group Co., Ltd., IPRP, PCT/CN2018/122409, Dec. 15, 2020, 4 pgs.
Midea Group Co., Ltd., Second Office Action, CN 201810602380.4, dated Mar. 16, 2021, 11 pgs.
8.3 Heat Pump Cold Air Conditioner, downloaded from website www.tianwenxdqkx.cn/n/dsrqw, Mar. 8, 2021, 7 pgs.
Supplementary Search Report, Application No. CN 2018106023804, dated Jun. 12, 2018, 4 pgs.

* cited by examiner

MOBILE AIR CONDITIONER

CROSS-REFERENCES TO RELATED APPLICATION

This application is a continuation of PCT International Application No. PCT/CN2018/122409, filed Dec. 20, 2018, which claims the benefit of and priority to Chinese Patent Application No. 201810602380.4, filed in the Chinese Patent Office on Jun. 12, 2018, the entire contents of which are herein incorporated by reference.

FIELD

The present application relates to the field of air conditioners, and particularly relates to a mobile air conditioner.

BACKGROUND

The existing mobile air conditioners have the advantages, such as a low cooling capacity, a small volume, and faster cooling in local areas as compared with the ordinary air conditioners. Moreover, mobile air conditioners have good mobility, can be conveniently moved to a space or an area requiring refrigeration, and are particularly suitable for occasions such as offices and workshops where there is no installation space for an outdoor unit, and can realize plug and play. However, in the process of implementing the present application, the inventors have found that the following problems exist in the prior art: the thick connecting pipeline which the existing mobile air conditioner needs in order to dissipate heat to the outside limits, to some extent, the flexibility and convenience of the use of the existing mobile air conditioner, and this becomes a pain point of use for the user.

SUMMARY

In order to solve at least one of the above technical problems, an object of the present application is to provide a mobile air conditioner.

In order to achieve the above object, an embodiment of the present application provides a mobile air conditioner, comprising: a first heat exchanger, having a first interface and a second interface for a refrigerant to enter and exit; a phase-change energy storage heat exchange device, including a second heat exchanger and a phase-change energy storage working medium, wherein the second heat exchanger and the phase-change energy storage working medium may exchange heat therebetween, and the second heat exchanger has a third interface and a fourth interface for the refrigerant to enter and exit; a first refrigerant pipeline, which is connected to the first interface and the third interface; and a second refrigerant pipeline, which is connected to the second interface and the fourth interface.

In the mobile air conditioner provided by the above embodiment of the present application, the second heat exchanger exchanges heat with the phase-change energy storage working medium. Compared with the structure of the existing mobile air conditioner in which the second heat exchanger is air-cooled and discharges heat emitted therefrom to the outside through a thick connecting pipeline, in this technical solution, heat emitted by the second heat exchanger is absorbed by the phase-change energy storage working medium, so that there is no need to discharge heat to the outside through a thick connecting pipeline. In this way, the mobile air conditioner is more flexible and convenient to use. Moreover, the phase-change energy storage working medium can directly absorb heat from the second heat exchanger and store the heat. In the process of indoor refrigeration, the mobile air conditioner generates less heat to the indoor environment, has more energy-efficient refrigeration operation, has higher indoor refrigeration efficiency, and leads to better use experience of refrigeration. Furthermore, air-cooling heat exchange is changed into heat exchange by a phase-change energy storage working medium at the second heat exchanger, which is favorable for improving the quiet performance of the product, and is especially suitable for resting places and offices, so that the advantages of convenience and comfort of the mobile air conditioner are fully exerted.

In addition, the mobile air conditioner in the above embodiment provided by the present application may further have the following additional technical features:

In the above technical solution, the first refrigerant pipeline includes a first communication branch communicated with the first interface and the third interface, and the first interface is communicated with the third interface when the first communication branch is opened.

In this technical solution, a first communication branch is provided, and the first interface is communicated with the third interface when the first communication branch is in an opened state. In a refrigeration condition of the mobile air conditioner, when it is detected that the temperature of the refrigerant at the third interface of the second heat exchanger is lower than room temperature and there is a certain temperature difference therebetween, by means of the first communication branch, the refrigerant discharged from the third interface can be directly discharged, through the first interface, into the first heat exchanger for evaporation, so that the refrigerant does not need to be throttled before entering the first heat exchanger. In this way, during evaporation in the first heat exchanger, the refrigerant will not produce sharp refrigeration, and the cold air is softer and more comfortable. The comfort of refrigeration may be improved especially when it is not necessary to reduce the indoor temperature rapidly or when there is no high requirement for refrigeration degree. Moreover, in such a mode, the condensation load at the second heat exchanger is small, so that it is possible to make full use of the characteristic that the temperature of the phase-change energy storage working medium can be kept stable in a phase-change temperature interval, to improve the stability of the evaporation temperature and the condensation temperature, which is favorable for maintaining comfort of the temperature of the room, has higher utilization rate of the cooling capacity of the phase-change energy storage working medium, and is favorable for ensuring high efficiency of the operation of the mobile air conditioner.

In the above technical solution, the first communication branch is opened when the temperature of the refrigerant flowing out of the third interface is lower than a current room temperature and there is a temperature difference of at least 3° C. therebetween.

In this technical solution, the first communication branch is configured to be opened when the temperature of a refrigerant flowing out of the third interface is lower than a current room temperature and there is a temperature difference of greater than or equal to 3° C. therebetween. In this way, when the refrigerant is cooled to a temperature 3° C. or more lower than the room temperature by exchanging heat with the phase-change energy storage working medium through the second heat exchanger, the refrigerant is allowed to directly enter the first heat exchanger for evaporation, without being throttled, which can ensure sufficient temperature difference driving force at the first heat exchanger to meet the indoor refrigeration requirement, reduce the condensation load at the second heat exchanger, and enable a wider selection range of the phase-change energy storage working medium. Moreover, heat exchange efficiency between the phase-change energy storage working medium and the second heat exchanger is higher, the utilization rate of the cooling capacity of the phase-change energy storage working medium is higher, energy loss of the whole mobile air conditioner is reduced, and the operation energy efficiency is higher.

More specifically, for example, one or more temperature sensors are used to detect the temperature of the refrigerant at the third interface of the second heat exchanger, or detect the pipe temperature at the third interface of the second heat exchanger to reflect the temperature of the refrigerant at the third interface, and feed back the detection result to a controller of the mobile air conditioner. In addition, one or more temperature sensors are used to detect the current room temperature and feed back the detection result to the controller of the mobile air conditioner. The controller determines, by, for example, a comparator or a built-in program, whether the condition that the temperature of the refrigerant flowing out of the third interface is lower than the current room temperature and there is a temperature difference of greater than or equal to 3° C. is satisfied. If so, the controller controls the first communication branch to be opened for response; and if not, the mobile air conditioner just operates based on an opened or closed state of the first communication branch in a preset mode or in a default mode.

More optionally, in the case where the first refrigerant pipeline includes the first communication branch, when the temperature of the refrigerant flowing out of the third interface is lower than the current room temperature and there is a temperature difference of greater than or equal to 3° C. and smaller than or equal to 10° C. therebetween, the first communication branch is opened.

In any of the above technical solutions, the first refrigerant pipeline includes a first one-way throttle branch communicated with the first interface and the third interface, and the first one-way throttle branch is configured to throttle the refrigerant from the second heat exchanger and then deliver the refrigerant to the first heat exchanger.

In this technical solution, a first one-way throttle branch is provided for throttling the refrigerant from the second heat exchanger and then delivering the refrigerant to the first heat exchanger, which is different from the refrigerant transmission function of the first communication branch. The first one-way throttle branch throttles the refrigerant and then delivers the refrigerant to the first heat exchanger. In this way, when the user has a relatively high requirement for refrigeration efficiency or when the user intends to quickly cool the room, the refrigerant can be throttled and then discharged to the first heat exchanger for evaporation, which can enhance the refrigeration efficiency and satisfy the user's requirement for refrigeration efficiency.

It can be understood by a person skilled in the art that, in the case where the first refrigerant pipeline comprises a first one-way throttle branch and a first communication branch, the first one-way throttle branch and the first communication branch may be arranged in parallel or in other forms. Due to the difference in flow resistance, when the first communication branch is opened, the refrigerant discharged from the second heat exchanger will be discharged to the first heat exchanger mainly along the first communication branch; and when the first communication branch is closed (i.e., not opened), the refrigerant discharged from the second heat exchanger will be discharged to the first heat exchanger along the first one-way throttle branch, which can realize switching between the first one-way throttle branch and the first communication branch according to the refrigeration requirement.

In the above technical solution, the first refrigerant pipeline further includes a second one-way throttle branch communicated with the first interface and the third interface, and the second one-way throttle branch is configured to throttle the refrigerant from the first heat exchanger and then deliver the refrigerant to the second heat exchanger.

In this technical solution, a second one-way throttle branch is provided to throttle the refrigerant from the first heat exchanger and then deliver the refrigerant to the second heat exchanger, so that when the phase-change energy storage working medium is saturated or nearly saturated with heat absorption after the mobile air conditioner is in cooling operation for a certain period of time and needs to be regenerated to recover the heat absorption capacity, this technical solution can enable the movable air conditioner to complete regeneration of the phase-change energy storage working medium, by controlling a refrigerant system. Specifically, for example, in contrast to the refrigeration operating condition in which the second heat exchanger acts as a condenser to provide a refrigerant to the first heat exchanger so that the first heat exchanger operates as an evaporator, in this technical solution, when the phase-change energy storage working medium is saturated or nearly saturated with heat absorption and needs to be regenerated, the first heat exchanger acts as a condenser and the second heat exchanger acts as an evaporator, the refrigerant discharged from the first heat exchanger is throttled through the second one-way throttle branch and then enters the second heat exchanger for evaporation and heat absorption, thereby realizing active regeneration and cold storage of the phase-change energy storage working medium by heat absorption by the second heat exchanger. In this way, there is no need for the user to replace the phase-change energy storage working medium, and the user also does not need to wait for a long time for natural temperature reduction and regeneration of the phase-change energy storage working medium, so that the product is more comfortable and convenient to use. Moreover, due to the mobile convenience of the mobile air conditioner, in the regeneration process of the phase-change energy storage working medium, the mobile air conditioner can be transferred to outdoor or other places with little influence on indoor environment, so that the condensation heat dissipation of the first heat exchanger will not cause discomfort, and the user experience is better.

In the above technical solution, the first one-way throttle branch and the second one-way throttle branch are configured to satisfy that a pressure drop after the refrigerant is throttled by the first one-way throttle branch is smaller than a pressure drop after the refrigerant is throttled by the second one-way throttle branch.

In this technical solution, the throttling pressure drop of the first one-way throttle branch playing a throttling role in the refrigeration mode is designed to be smaller than the throttling pressure drop of the second one-way throttle branch playing a throttling role in the energy storage mode. In this way, deep throttling will not occur in the refrigeration mode. That is, no deep throttling occurs on the first one-way throttle branch relative to the second one-way throttle branch. This is better for maintaining the ideal evaporation temperature in the room, and will not produce a harsh cooling effect. The cold air is softer and more comfortable.

It is also possible to reduce the condensation load at the second heat exchanger under the cooling condition, and the selection range of the phase-change energy storage working medium is correspondingly wider. Moreover, the efficiency of heat exchange between the phase-change energy storage working medium and the second heat exchanger is higher, and the utilization rate of the cooling capacity of the phase-change energy storage working medium is also higher, so that energy loss of the whole mobile air conditioner is reduced, and the operation energy efficiency is higher. For the energy storage condition, the throttling depth of the second one-way throttle branch is relatively large, so that the regeneration process of the phase-change energy storage working medium is accelerated, and the regeneration period is shortened, which is favorable for reducing energy loss in the regeneration process, can realize a relatively low cold storage temperature of the phase-change energy storage working medium, and can more effectively satisfy the condensation requirement of the second heat exchanger under the refrigeration condition. In general, by this technical solution, there is a difference between the cool discharge period and the regeneration period of the phase-change energy storage working medium, which can comprehensively urge the mobile air conditioner to advance in the direction of improving energy efficiency, and is conducive to realizing the improvement in energy efficiency of the mobile air conditioner.

In any of the above technical solutions, the mobile air conditioner further comprises a temperature detection unit configured to detect a temperature of the phase-change energy storage working medium, and send out a first signal when detecting that the temperature of the phase-change energy storage working medium rises to a first preset limit; and a controller electrically connected to the temperature detection unit, the controller being configured to set out a first instruction in response to the first signal, the first instruction being used for triggering the mobile air conditioner to stop operating in a refrigeration mode, or the controller being configured to set out a second instruction in response to the first signal, the second instruction being used for triggering a reminding device to executing a reminding function.

In this technical solution, when it is detected that the temperature of the phase-change energy storage working medium reaches a first preset limit, the mobile air conditioner is controlled to stop operating in the refrigeration mode, or the reminding device is controlled to execute areminding function (e.g., a buzzer produces a buzzing sound, a flash lamp is fired, a voice broadcaster performs voice broadcasting, a horn rings, etc.) to remind the user that the phase-change energy storage working medium needs to be regenerated. It can be understood that the higher the temperature of the phase-change energy storage working medium is, the weaker the condensation effect at the second heat exchanger will be. By establishing a feedback regulation between the temperature of the phase-change energy storage working medium and the operation of the refrigeration mode or the reminding of the reminding device, it is possible to ensure that the operation energy efficiency of the mobile air conditioner is maintained in a preset good state, low-efficiency operation is avoided and resource utilization efficiency is improved.

In the above technical solution, the first preset limit is 8° C. to 20° C.

In this technical solution, the first preset limit is set to be 8° C. to 20° C., and optionally the first preset limit is 8° C. to 15° C. Controlling the mobile air conditioner to stop operating in the refrigeration mode or send out a reminder when the temperature of the phase-change energy storage working medium is detected to reach 8° C. to 20° C. is conducive to ensuring that the operation energy efficiency of the mobile air conditioner is maintained in a preset good state, which at least ensures a sufficient temperature difference driving force at the first heat exchanger to ensure indoor cooling efficiency, avoids low-efficiency operation, and improves resource utilization efficiency. Optionally, a person skilled in the art may further determine the first preset limit in the temperature interval of 8° C. to 20° C. based on the specific type of the phase-change energy storage working medium. It can be understood that the phase-change energy storage working medium has very small temperature changes in a phase change zone and is substantially stable, and has a sensible heat state above the phase change temperature, and exhibits a significant temperature rise as the condensation process proceeds. At the time of determining the specific value of the first preset limit, it is preferable to make the first preset limit as close as possible to the phase change temperature of the phase-change energy storage working medium.

In any of the above technical solutions, the temperature detection unit may further be configured to send out a second signal when detecting that the temperature of the phase-change energy storage working medium decreases to a second preset limit, and the controller may further be configured to set out a third instruction in response to the second signal, the third instruction being used for triggering the mobile air conditioner to stop operating in an energy storage mode.

In this technical solution, by controlling the mobile air conditioner to stop operating in the energy storage mode when it is detected that the temperature of the phase-change energy storage working medium reaches the second preset limit, it is possible to take the reaching of the temperature of the phase-change energy storage working medium to the second preset limit as a reference of completion of the regeneration work, so as to realize automatic ending of the regeneration operation after the regeneration of the phase-change energy storage working medium is completed, and avoid unnecessary energy waste.

In the above technical solution, the second preset limit is −10° C. to −4° C.

In this technical solution, the second preset limit is set to be −10° C. to −4° C., and this second preset limit is taken as an ending point for ending the energy storage mode. This temperature interval can substantially ensure that regeneration of the phase-change energy storage working medium is completed, which can avoid unnecessary energy waste and reduce the operation cost of the product. Moreover, optionally, a person skilled in the art may further determine the second preset limit in the interval of −10° C. to −4° C. based on the specific type of the phase-change energy storage working medium. In this way, the temperature of the phase-change energy storage working medium will not be excessively low to bring forth a harsh refrigeration effect, so that the use experience of the refrigeration condition is more excellent; and for the product, energy loss in terms of cold storage and cold preservation is relatively low, and the operation cost is low.

In any of the above technical solutions, the second refrigerant pipeline includes a second communication branch communicated with the second interface and the fourth interface, and a height of the second heat exchanger being located is higher than a height of the first heat exchanger being located, to enable the refrigerant in the second heat exchanger to be transported by gravity to the first heat exchanger along the first communication branch.

In this technical solution, mainly in the working condition of the refrigeration mode, the second communication branch communicates the second interface of the first heat exchanger acting as a refrigerant outlet with the fourth interface of the second heat exchanger acting as a refrigerant inlet, and the first heat exchanger, the second heat exchanger, the first communication branch and the second communication branch form a loop. The second heat exchanger is located higher than the first heat exchanger, so that the condensed refrigerant in the second heat exchanger can automatically sink by gravity potential energy and is transported by gravity along the first communication branch to the first heat exchanger for evaporation. In the first heat exchanger, the refrigerant spontaneously moves upward after being evaporated. At this time, the gaseous refrigerant moving upward spontaneously can rise along the second communication branch and return to the second heat exchanger to complete refrigerant circulation, thereby forming a refrigerant circulation automatically driven by the thermosyphonic effect, without the need of a driving member such as a circulating pump and a compressor to drive the refrigerant, which further saves energy consumption, and can also substantially avoid the problem of driving noise, leading to a corresponding improvement in product comfort.

In any of the above technical solutions, the second refrigerant pipeline includes a second communication branch communicated with the second interface and the fourth interface, and at least one of the first communication branch and the second communication branch is connected with a driving member configured to drive the refrigerant to flow.

In this technical solution, the refrigerant is driven to flow by using a pumping driving member such as a circulating pump, which has significantly improved effects in terms of the noise problem and the driving energy consumption problem, as compared with the form of driving by a compressor.

In any of the above technical solutions, the second refrigerant pipeline includes a compressor having a gas discharge port and a gas return port, and a four-way valve communicated with the gas discharge port, the gas return port, the second interface and the fourth interface; the four-way valve is configured to control the gas discharge port and the fourth interface to be communicated therebetween and control the gas return port and the second interface to be communicated therebetween, and the four-way valve may further be configured to control the gas return port and the fourth interface to be communicated therebetween, and control the gas discharge port and the second interface to be communicated therebetween.

More specifically, when in a first state, the four-way valve controls the gas discharge port and the fourth interface to be communicated therebetween and controls the gas return port and the second interface to be communicated therebetween, so as to form a refrigeration loop of the refrigerant. In this case, the mobile air conditioner operates in the refrigeration mode. When in a second state, the four-way valve controls the gas return port and the fourth interface to be communicated therebetween, and controls the gas discharge port and the second interface to be communicated therebetween, so as to form a refrigerant energy storage loop (similar to the heating loop of the mobile air conditioner). In this case, the mobile air conditioner operates in the energy storage mode.

In any of the above technical solutions, the second refrigerant pipeline includes: a compressor having a gas return port and a gas discharge port; a first gas return pipe communicated with the gas return port and the fourth interface and being connected with a third valve, and the third valve being configured to open or close the first gas return pipe; a second gas return pipe communicated with the gas return port and the second interface and being connected with a fourth valve, and the fourth valve being configured to open or close the second gas return pipe; a first gas discharge pipe communicated with the gas discharge port and the fourth interface and being connected with a fifth valve, and the fifth valve being configured to open or close the first gas discharge pipe; and a second gas discharge pipe communicated with the gas discharge port and the second interface, a sixth valve being connected to the second gas discharge pipe, and the sixth valve being configured to open or close the second gas discharge pipe.

More specifically, the third valve and the sixth valve are in an opened state, and the fourth valve and the fifth valve are in a closed state, thereby forming an energy storage loop (similar to the heating loop of the mobile air conditioner) of the refrigerant. In this case, the mobile air conditioner operates in the energy storage mode. The fourth valve and the fifth valve are in an opened state, and the third valve and the sixth valve are in a closed state, thereby forming a refrigeration loop of the refrigerant. In this case, the mobile air conditioner operates in the refrigeration mode.

In any of the above technical solutions, the compressor is provided with an interface configured to electrically connect the compressor to an external power source.

In any of the above technical solutions, the mobile air conditioner further comprises a battery electrically connected to the compressor and supplying power to the compressor.

In any of the above technical solutions, the second heat exchanger includes at least one of a coil heat exchanger, a finned tube heat exchanger and a spiral fin heat exchanger.

In any of the above technical solutions, the first one-way throttle branch includes at least one of a capillary tube, an electronic expansion valve and a thermostatic expansion valve.

In any of the above technical solutions, the second one-way throttle branch includes at least one of a capillary tube, an electronic expansion valve and a thermostatic expansion valve.

Additional aspects and advantages of the present application will become apparent in the following description, or are understood by the practice of the present application.

BRIEF DESCRIPTION OF THE DRAWINGS

The above and/or additional aspects and advantages of the present application will become apparent and readily understood from the description of embodiments in conjunction with the following drawings, in which.

Figure 1:
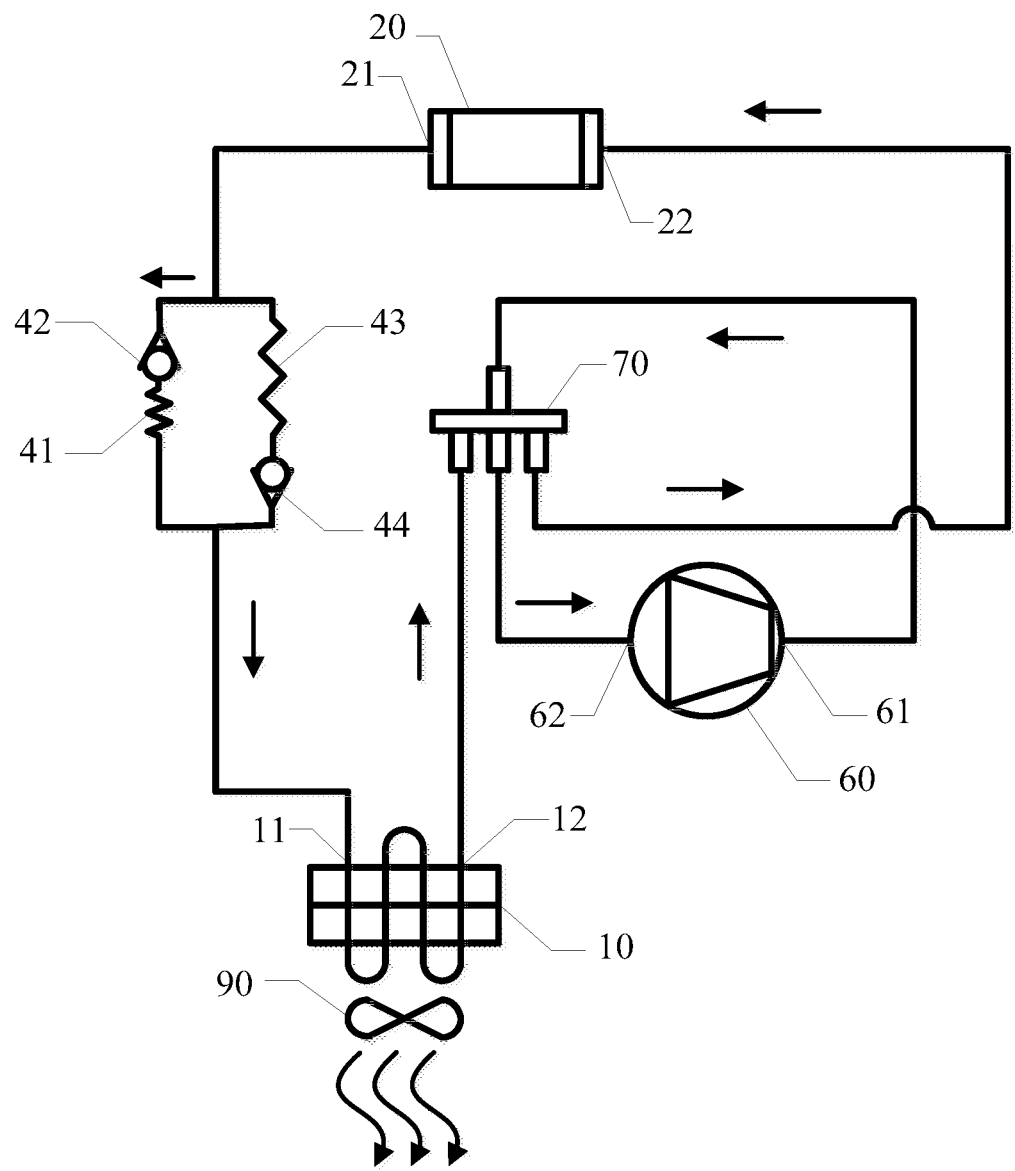
FIG. 1 is a schematic structural diagram of a mobile air conditioner in a refrigeration mode according to an embodiment of the present application.

The corresponding relationship between the reference signs and component names in FIG. 1 to FIG. 5 is as follows: 10 first heat exchanger, 11 first interface, 12 second interface, 20 phase-change energy storage heat exchange device, 21 third interface, 22 fourth interface, 41 first capillary tube, 42 first one-way valve, 43 second capillary tube, 44 second one-way valve, 51 first communication branch, 52 second communication branch, 60 compressor, 61 gas discharge port, 62 gas return port, 70 four-way valve, 81 first gas return pipe, 811 third valve, 82 second gas return pipe, 821 fourth valve, 83 first gas discharge pipe, 831 fifth valve, 84 second gas discharge pipe, 841 sixth valve, and 90 fan.

DETAILED DESCRIPTION OF THE DISCLOSURE

In order that the above-mentioned objectives, features and advantages of the present application can be understood more clearly, a further detailed description of the present application will be given below in connection with the accompanying drawings and specific embodiments. It should be noted that the embodiments of the present application and the features in the embodiments can be combined with each other if there is no conflict.

In the following description, numerous specific details are set forth in order to provide a thorough understanding of the present application. However, the present application can also be implemented in other manners than those described herein. Therefore, the protection scope of the present application is not limited to the specific embodiments disclosed below.

A mobile air conditioner according to some embodiments of the present application is described below with reference to FIG. 1 to FIG. 5.

As shown in FIG. 1 to FIG. 5, a mobile air conditioner according to an embodiment of the present application comprises: a first heat exchanger 10, a phase-change energy storage heat exchange device 20, a first refrigerant pipeline and a second refrigerant pipeline.

Specifically, the first heat exchanger 10 has a first interface 11 and a second interface 12 for a refrigerant to enter and exit; the phase-change energy storage heat exchange device 20 comprises a second heat exchanger and a phase-change energy storage working medium (also known as a phase-change energy storage material), the second heat exchanger and the phase-change energy storage working medium may exchange heat therebetween, and the second heat exchanger has a third interface 21 and a fourth interface 22 for the refrigerant to enter and exit; the first refrigerant pipeline is connected to the first interface 11 and the third interface 21; and the second refrigerant pipeline is connected to the second interface 12 and the fourth interface 22.

More specifically, for example, the phase-change energy storage heat exchange device 20 may comprise a container, the second heat exchanger is accommodated in the container, the phase-change energy storage working medium is contained in the container, and the phase-change energy storage working medium in the container and the second heat exchanger may exchange heat therebetween by direct contact convection or by heat conduction through a heat conducting member.

In the mobile air conditioner provided by the above embodiment of the present application, the second heat exchanger exchanges heat with the phase-change energy storage working medium. Compared with the structure of the existing mobile air conditioner in which the second heat exchanger is air-cooled and discharges heat emitted therefrom to the outside through a thick connecting pipeline, in this technical solution, heat emitted by the second heat exchanger is absorbed by the phase-change energy storage working medium, so that there is no need to discharge heat to the outside through a thick connecting pipeline. In this way, the mobile air conditioner is more flexible and convenient to use. Moreover, the phase-change energy storage working medium can directly absorb heat from the second heat exchanger and store the heat. In the process of indoor refrigeration, the mobile air conditioner generates less heat to the indoor environment, has more energy-efficient refrigeration operation, has higher indoor refrigeration efficiency, and leads to better use experience of refrigeration. Furthermore, air-cooling heat exchange is changed into heat exchange by a phase-change energy storage working medium at the second heat exchanger, which is favorable for improving the quiet performance of the product, and is especially suitable for resting places and offices, so that the advantages of convenience and comfort of the mobile air conditioner are fully exerted.

More specifically, the phase-change energy storage working medium is also called phase-change material. The phase-change energy storage working medium has small temperature fluctuations in the phase change zone. Compared with air-cooling heat exchange, using the phase-change energy storage working medium to exchange heat with the second heat exchanger not only can realize energy storage heat exchange and reduce heat dissipation of the second heat exchanger to the environment, but also has the advantages such as high heat exchange efficiency and good temperature stability, which is conducive to controlling the mobile air conditioner to operate at ideal evaporation temperature and condensing temperature, thereby improving the cooling efficiency of the mobile air conditioner.

The first refrigerant pipeline is a pipeline system for the circulation and operation of the refrigerant, and the second refrigerant pipeline is a pipeline system for the circulation and operation of the refrigerant.

Figure 5:
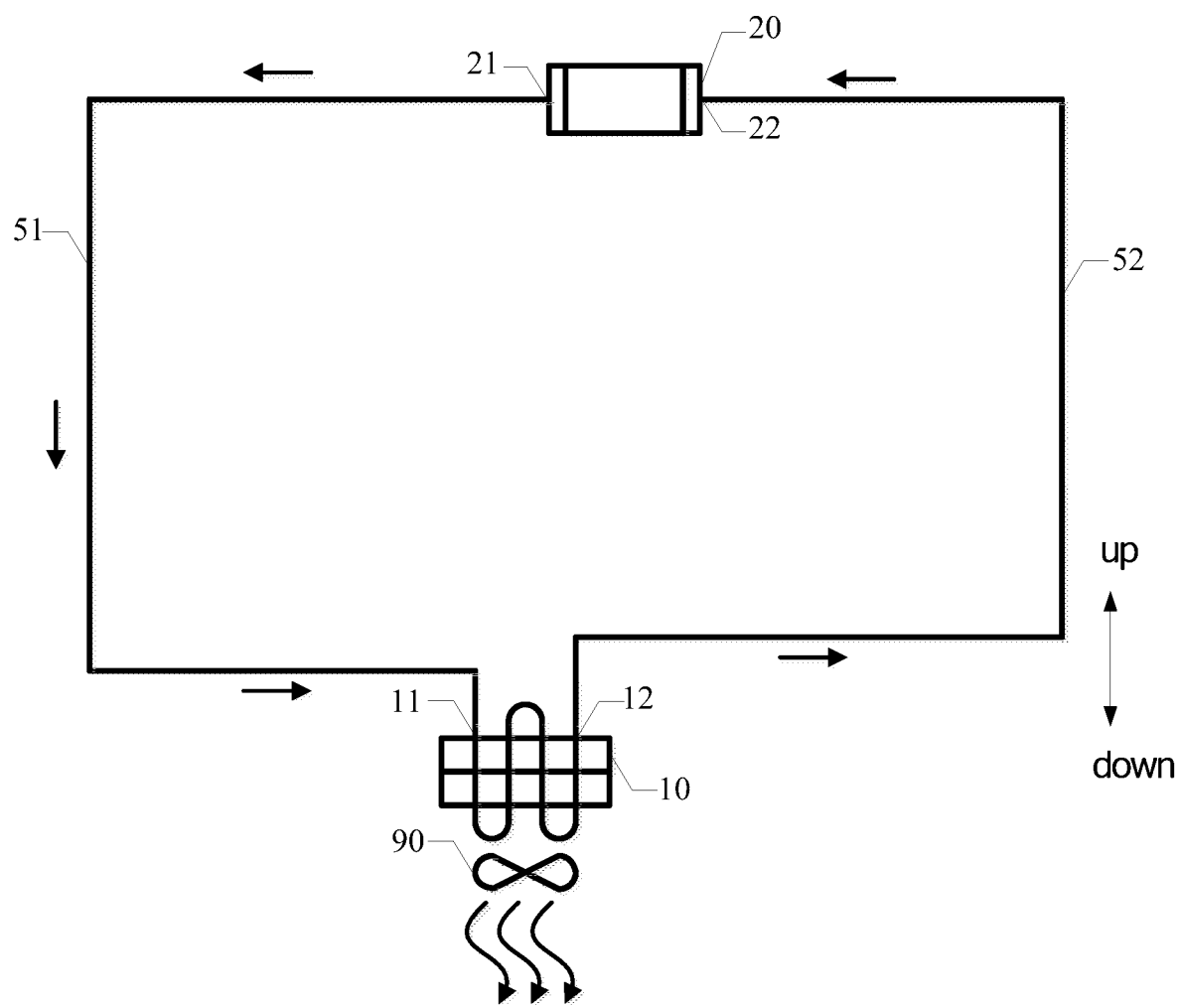
FIG. 5 is a schematic structural diagram of a mobile air conditioner in a siphon mode according to an embodiment of the present application.

In an embodiment of the present application, as shown in FIG. 5, the first refrigerant pipeline includes a first communication branch 51 communicated with the first interface 11 and the third interface 21, and the first interface 11 is communicated with the third interface 21 when the first communication branch 51 is opened.

More specifically, when opened, the first communication branch 51 serves the function of communicating, similar to a refrigerant pipe. Specifically, for example, the first communication branch 51 may comprise a refrigerant pipe and a control valve for opening or closing the refrigerant pipe, to realize that the refrigerant pipe communicates the first interface 11 with the third interface 21, in the case where the control valve controls the refrigerant pipe to be opened.

In this technical solution, in a refrigeration condition of the mobile air conditioner, when it is detected that the temperature of the refrigerant at the third interface 21 of the second heat exchanger is lower than room temperature and there is a certain temperature difference therebetween, by means of the first communication branch 51, the refrigerant discharged from the third interface 21 can be directly discharged, through the first interface 11, into the first heat exchanger 10 for evaporation, so that the refrigerant does not need to be throttled before entering the first heat exchanger 10. In this way, during evaporation in the first heat exchanger 10, the refrigerant will not produce sharp refrigeration, and the cold air is softer and more comfortable. The comfort of refrigeration may be improved especially when it is not necessary to reduce the indoor temperature rapidly or when there is no high requirement for refrigeration degree. Moreover, in such a mode, the condensation load at the second heat exchanger is small, so that it is possible to make full use of the characteristic that the temperature of the phase-change energy storage working medium can be kept stable in a phase-change temperature interval, to improve the stability of the evaporation temperature and the condensation temperature, which is favorable for maintaining comfort of the temperature of the room, has higher utilization rate of the cooling capacity of the phase-change energy storage working medium, and is favorable for ensuring high efficiency of the operation of the mobile air conditioner.

Figure 2:
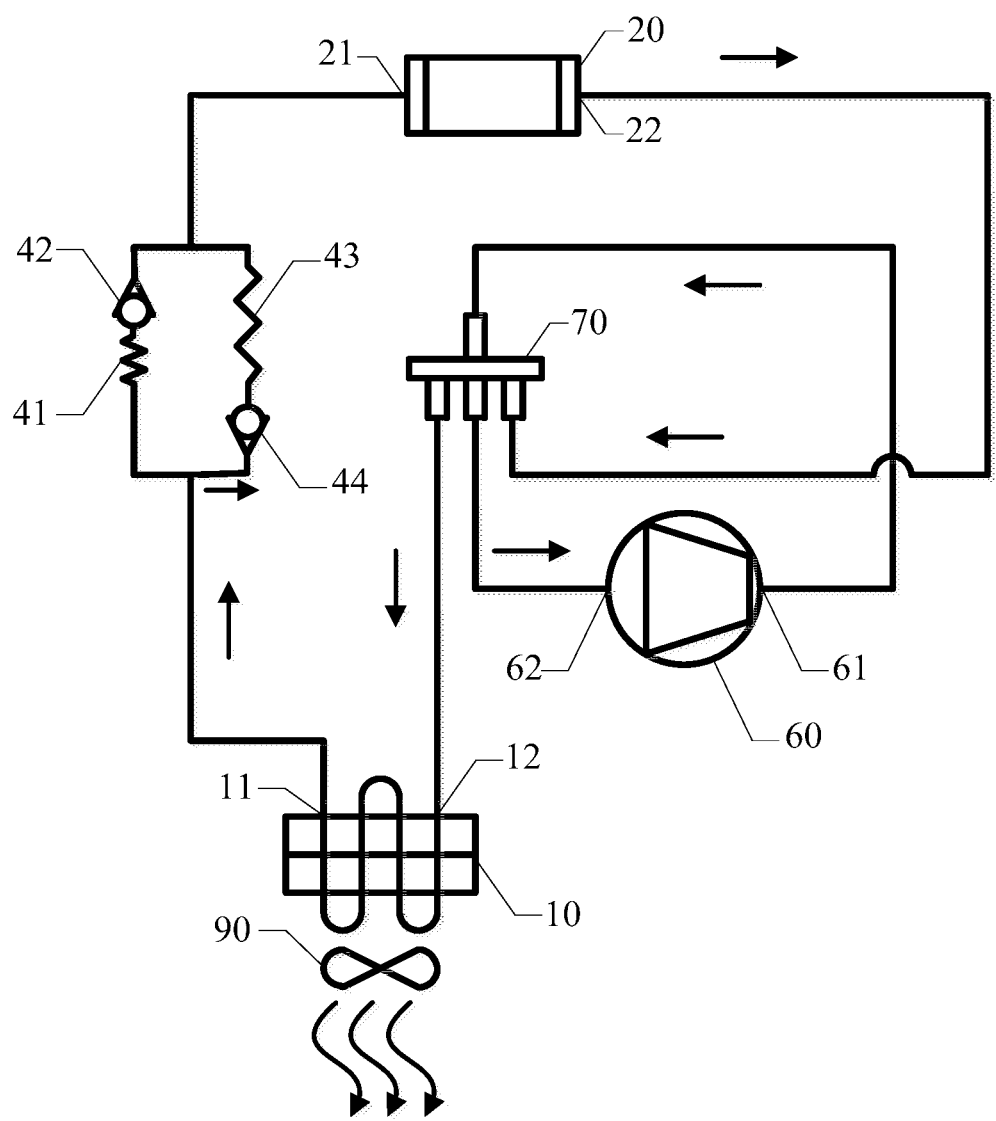
FIG. 2 is a schematic structural diagram of a mobile air conditioner in a heating mode according to an embodiment of the present application.
Figure 4:
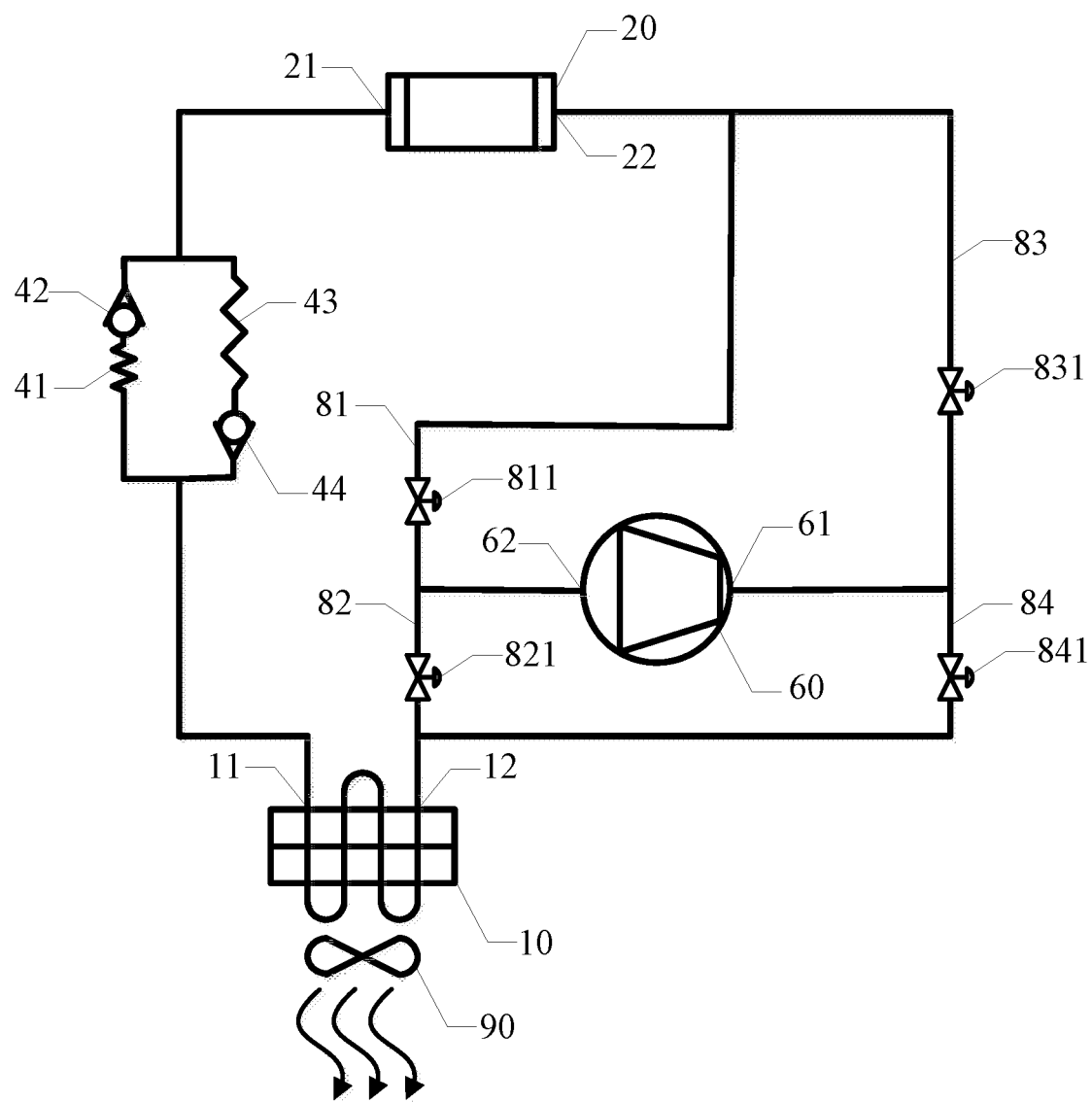
FIG. 4 is a schematic diagram of a system structure of a mobile air conditioner according to an embodiment of the present application.

In an embodiment of the present application, as shown in FIGS. 1, 2 and 4, the first refrigerant pipeline comprises a first one-way throttle branch communicated with the first interface 11 and the third interface 21, and the first one-way throttle branch is configured to throttle a refrigerant from the second heat exchanger and then deliver the refrigerant to the first heat exchanger 10.

More specifically, as shown in FIG. 1, the first one-way throttle branch specifically comprises a first one-way valve 42 that realizes one-way flow from the second heat exchanger to the first heat exchanger 10 (i.e., from the third interface 21 to the first interface 11) and a first capillary tube 41 for serving the throttling function. The pressure drop of the refrigerant on the first capillary tube 41 may be reflected by the length of the first capillary tube 41, and they are positively correlated. Of course, the first capillary tube 41 may also be replaced by an electronic expansion valve, a thermostatic expansion valve, etc. It is understandable that when an electronic expansion valve or a thermostatic expansion valve is used, the pressure drop of the refrigerant on the electronic expansion valve or the thermostatic expansion valve may be reflected by the opening degree of the expansion valve, and they are positively correlated.

In this technical solution, a first one-way throttle branch is provided for throttling the refrigerant from the second heat exchanger and then delivering the refrigerant to the first heat exchanger 10, which is different from the refrigerant transmission function of the first communication branch 51. The first one-way throttle branch throttles the refrigerant and then delivers the refrigerant to the first heat exchanger 10. In this way, when the user has a relatively high requirement for refrigeration efficiency or when the user intends to quickly cool the room, the refrigerant can be throttled and then discharged to the first heat exchanger 10 for evaporation, which can enhance the refrigeration efficiency and satisfy the user's requirement for refrigeration efficiency.

Figure 3:
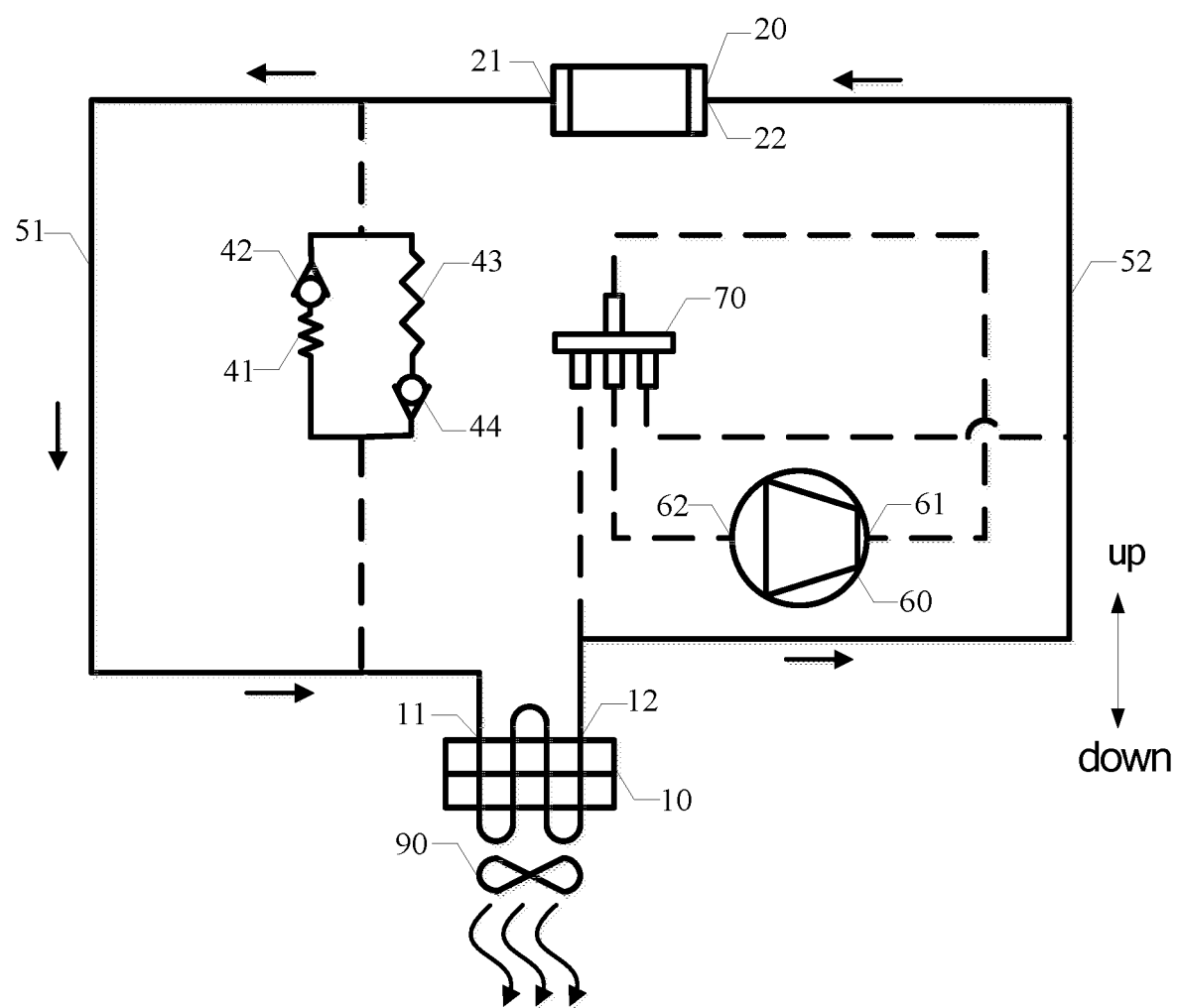
FIG. 3 is a schematic structural diagram of a mobile air conditioner in a siphon mode according to an embodiment of the present application.

In an embodiment of the present application, as shown in FIG. 3, the first refrigerant pipeline comprises a first communication branch 51 and a first one-way throttle branch. The first communication branch 51 is arranged in parallel with the first one-way throttle branch. The first communication branch 51 is communicated with the first interface 11 and the third interface 21. When opened, the first communication branch 51 communicates the first interface 11 with the third interface 21. The first one-way throttle branch is communicated with the first interface 11 and the third interface 21. The first one-way throttle branch is configured to throttle the refrigerant from the second heat exchanger and then transport it to the first heat exchanger 10.

It can be understood by a person skilled in the art that, in the case where the first refrigerant pipeline comprises a first one-way throttle branch and a first communication branch 51, due to the difference in flow resistance, when the first communication branch 51 is opened, the refrigerant discharged from the second heat exchanger will be discharged to the first heat exchanger 10 mainly along the first communication branch 51; and when the first communication branch 51 is closed (i.e., not opened), the refrigerant discharged from the second heat exchanger will be discharged to the first heat exchanger 10 along the first one-way throttle branch, which can realize switching between the first one-way throttle branch and the first communication branch 51 according to the refrigeration requirement.

In an embodiment of the present application, as shown in FIGS. 1-4, the first refrigerant pipeline further comprises a second one-way throttle branch. The second one-way throttle branch is communicated with the first interface 11 and the third interface 21, and the second one-way throttle branch is configured to throttle a refrigerant from the first heat exchanger 10 and then deliver the refrigerant to the second heat exchanger.

More specifically, as shown in FIG. 2, the second one-way throttle branch comprises a second one-way valve 44 that realizes one-way flow from the first heat exchanger 10 to the second heat exchanger (i.e., from the first interface 11 to the third interface 21) and a second capillary tube 43 for serving the throttling function. The pressure drop of the refrigerant on the second capillary tube 43 may be reflected by the length of the second capillary tube 43, and they are positively correlated. Of course, the second capillary tube 43 may also be replaced by an electronic expansion valve, a thermostatic expansion valve, etc. It is understandable that when an electronic expansion valve or a thermostatic expansion valve is used, the pressure drop of the refrigerant on the electronic expansion valve or the thermostatic expansion valve may be reflected by the opening degree of the expansion valve, and they are positively correlated.

In this technical solution, when the phase-change energy storage working medium is saturated or nearly saturated with heat absorption and needs to be regenerated, in this technical solution, the first heat exchanger 10 acts as a condenser and the second heat exchanger acts as an evaporator, the refrigerant discharged from the first heat exchanger 10 is throttled through the second one-way throttle branch and then enters the second heat exchanger for evaporation and heat absorption, thereby realizing active regeneration and cold storage of the phase-change energy storage working medium by heat absorption by the second heat exchanger. In this way, there is no need for the user to replace the phase-change energy storage working medium, and the user also does not need to wait for a long time for natural temperature reduction and regeneration of the phase-change energy storage working medium, so that the product is more comfortable and convenient to use. Moreover, due to the mobile convenience of the mobile air conditioner, in the regeneration process of the phase-change energy storage working medium, the mobile air conditioner can be transferred to outdoor or other places with little influence on indoor environment, so that the condensation heat dissipation of the first heat exchanger 10 will not cause discomfort, and the user experience is better.

In an embodiment of the present application, optionally, the first refrigerant pipeline comprises a first one-way throttle branch and a second one-way throttle branch, wherein a pressure drop after the refrigerant is throttled by the first one-way throttle branch is smaller than a pressure drop after the refrigerant is throttled by the second one-way throttle branch. In this way, no deep throttling will occur on the first one-way throttle branch relative to the second one-way throttle branch in the refrigeration mode. Compared with the general throttling depth, the shallow throttling at the first one-way throttle branch has a better effect on maintaining the ideal evaporating temperature in the room, and will not produce a harsh cooling effect, and the cold air is softer and more comfortable. Moreover, it is possible to reduce the condensation load at the second heat exchanger, and the selection range of the phase-change energy storage working medium is correspondingly wider. Moreover, the efficiency of heat exchange between the phase-change energy storage working medium and the second heat exchanger is higher, and the utilization rate of the cooling capacity of the phase-change energy storage working medium is also higher, so that energy loss of the whole mobile air conditioner is reduced, and the operation energy efficiency is higher. For the energy storage condition, the throttling depth of the second one-way throttle branch is relatively large, so that the regeneration process of the phase-change energy storage working medium is accelerated, and the regeneration period is shortened, which is favorable for reducing energy loss in the regeneration process, can realize a lower cold storage temperature of the phase-change energy storage working medium, and can more effectively satisfy the condensation requirement at the second heat exchanger under the refrigeration condition. In general, by this technical solution, there is a difference between the cool discharge period and the regeneration period of the phase-change energy storage working medium, which can comprehensively urge the mobile air conditioner to advance in the direction of improving energy efficiency, and is conducive to realizing the improvement in energy efficiency of the mobile air conditioner.

In an embodiment of the present application, the first refrigerant pipeline comprises a first communication branch 51, and the first communication branch 51 is opened in the case where the temperature of a refrigerant flowing out of the third interface 21 is lower than a current room temperature and there is a temperature difference of greater than or equal to 3° C. therebetween. In this way, when the refrigerant is cooled to a temperature 3° C. or more lower than the room temperature by exchanging heat with the phase-change energy storage working medium through the second heat exchanger, the refrigerant is allowed to directly enter the first heat exchanger 10 for evaporation, without being throttled, which can ensure sufficient temperature difference driving force at the first heat exchanger 10 to meet the indoor refrigeration requirement, reduce the condensation load at the second heat exchanger, and enable a wider selection range of the phase-change energy storage working medium. Moreover, heat exchange efficiency between the phase-change energy storage working medium and the second heat exchanger is higher, the utilization rate of the cooling capacity of the phase-change energy storage working medium is higher, energy loss of the whole mobile air conditioner is reduced, and the operation energy efficiency is higher.

More specifically, one or more temperature sensors can be used to detect the temperature of the refrigerant at the third interface 21 of the second heat exchanger, or detect the pipe temperature at the third interface 21 of the second heat exchanger to reflect the temperature of the refrigerant at the third interface 21, and feed back the detection result to a controller of the mobile air conditioner. In addition, one or more temperature sensors can be used to detect the current room temperature and feed back the detection result to the controller of the mobile air conditioner. The controller determines, by, for example, a comparator or a built-in program, whether the condition that the temperature of the refrigerant flowing out of the third interface 21 is lower than the current room temperature and there is a temperature difference of greater than or equal to 3° C. is satisfied. If so, the controller controls the first communication branch 51 to be opened for response; and if not, the mobile air conditioner just operates based on an opened or closed state of the first communication branch 51 in a preset mode or in a default mode.

More optionally, when the temperature of the refrigerant flowing out of the third interface 21 is lower than the current room temperature and there is a temperature difference of greater than or equal to 3° C. and smaller than or equal to 10° C. therebetween, the first communication branch 51 is opened.

In any of the above embodiments, the mobile air conditioner further comprises a temperature detection unit (such as a temperature sensor), the temperature detection unit being configured to detect a temperature of the phase-change energy storage working medium, and send out a first signal when detecting that the temperature of the phase-change energy storage working medium rises to a first preset limit; and a controller electrically connected to the temperature detection unit, and capable of issuing, in response to the first signal, an instruction for controlling the mobile air conditioner to stop operating in the refrigeration mode, or issuing, in response to the first signal, an instruction for triggering a reminding device to executing a reminding function.

When the mobile air conditioner operates in the refrigeration mode, the refrigerant flows from the third interface 21 to the first interface 11. More specifically, as shown in FIG. 1, the refrigerant flows from the third interface 21 to the first interface 11 along the first throttle branch, or as shown in FIGS. 3 and 5, the refrigerant flows from the third interface 21 to the first interface 11 along the first communication branch 51. By establishing a feedback regulation between the temperature of the phase-change energy storage working medium and the operation of the refrigeration mode or the reminding of the reminding device, it is possible to ensure that the operation energy efficiency of the mobile air conditioner is maintained in a preset good state, low-efficiency operation is avoided and resource utilization efficiency is improved.

Optionally, the first preset limit is 8° C. to 20° C. Further optionally, the first preset limit is 8° C. to 15° C. Controlling the mobile air conditioner to stop operating in the refrigeration mode or send out a reminder when the temperature of the phase-change energy storage working medium is detected to reach 8° C. to 20° C. is conducive to ensuring that the operation energy efficiency of the mobile air conditioner is maintained in a preset good state, which at least ensures a sufficient temperature difference driving force at the first heat exchanger 10 to ensure indoor cooling efficiency, avoids low-efficiency operation, and improves resource utilization efficiency. Optionally, a person skilled in the art may further determine the first preset limit in the temperature interval of 8° C. to 20° C. based on the specific type of the phase-change energy storage working medium. It can be understood that the phase-change energy storage working medium has very small temperature changes in a phase change zone and is substantially stable, and has a sensible heat state above the phase change temperature, and exhibits a significant temperature rise as the condensation process proceeds. At the time of determining the specific value of the first preset limit, it is preferable to make the first preset limit as close as possible to the phase change temperature of the phase-change energy storage working medium.

Further, the temperature detection unit may further be configured to send out a second signal when detecting that the temperature of the phase-change energy storage working medium reaches a second preset limit, and the controller is configured to set out, in response to the second signal, an instruction for controlling the mobile air conditioner to stop operating in an energy storage mode.

As shown in FIG. 2, when the mobile air conditioner is operating in the energy storage mode, the refrigerant flows from the first interface 11 to the third interface 21 along the second throttle branch. By controlling the mobile air conditioner to stop operating in the energy storage mode when it is detected that the temperature of the phase-change energy storage working medium decreases to the second preset limit, it is possible to take the reaching of the temperature of the phase-change energy storage working medium to the second preset limit as a reference of completion of the regeneration work, so as to realize automatic ending of the regeneration operation after the regeneration of the phase-change energy storage working medium is completed, and avoid unnecessary energy waste.

Optionally, the second preset limit is −10° C. to −4° C., and this second preset limit is taken as an ending point for ending the energy storage mode. This temperature interval can substantially ensure that regeneration of the phase-change energy storage working medium is completed, which can avoid unnecessary energy waste and reduce the operation cost of the product. Moreover, optionally, a person skilled in the art may further determine the second preset limit in the interval of −10° C. to −4° C. based on the specific type of the phase-change energy storage working medium. In this way, the temperature of the phase-change energy storage working medium will not be excessively low to bring forth a harsh refrigeration effect, so that the use experience of the refrigeration condition is excellent; and for the product, energy loss in terms of cold storage and cold preservation is relatively low, and the operation cost is low.

In an embodiment of the present application, as shown in FIGS. 3 and 5, the first refrigerant pipeline comprises a first communication branch 51, and the second refrigerant pipeline comprises a second communication branch 52. The second communication branch 52 is communicated with the second interface 12 and the fourth interface 22. The second heat exchanger is located higher than the first heat exchanger 10, to enable the refrigerant in the second heat exchanger to be transported by gravity to the first heat exchanger 10 along the first communication branch 51.

More specifically, when opened, the second communication branch 52 serves the function of communicating, similar to a refrigerant pipe. Specifically, for example, the second communication branch 52 may comprise a refrigerant pipe and a control valve for opening or closing the refrigerant pipe.

This technical solution is mainly directed to the refrigeration mode condition. the second communication branch 52 communicates the second interface 12 of the first heat exchanger 10 acting as a refrigerant outlet with the fourth interface 22 of the second heat exchanger acting as a refrigerant inlet, and the first heat exchanger 10, the second heat exchanger, the first communication branch 51 and the second communication branch 52 form a loop. The second heat exchanger is located higher than the first heat exchanger 10, so that the condensed refrigerant in the second heat exchanger can automatically sink by gravity potential energy and is transported by gravity along the first communication branch 51 to the first heat exchanger 10 for evaporation. In the first heat exchanger 10, the refrigerant spontaneously moves upward after being evaporated. At this time, the gaseous refrigerant moving upward spontaneously can rise along the second communication branch 52 and return to the second heat exchanger to complete refrigerant circulation, thereby forming a refrigerant circulation automatically driven by the thermosyphonic effect, that is, the refrigerant of the mobile air conditioner partially operates in a siphon mode, without the need of a driving member such as a circulating pump and a compressor 60 to drive the refrigerant, which further saves energy consumption, and can also substantially avoid the problem of driving noise, leading to a corresponding improvement in product comfort.

Of course, this technical solution is not limited to this. A person skilled in the art may also directly use a pumping driving member such as a circulating pump to drive the refrigerant to flow according to needs, which has significantly improved effects in terms of the noise problem and the driving energy consumption problem, as compared with the form of driving by a compressor 60.

In an embodiment of the present application, as shown in FIGS. 1 and 2, the second refrigerant pipeline comprises a compressor 60 and a four-way valve 70. The compressor 60 has a gas discharge port 61 and a gas return port 62. The four-way valve 70 is communicated with the gas discharge port 61, the gas return port 62, the second interface 12 and the fourth interface 22. The four-way valve 70 is configured to control the gas discharge port 61 and the fourth interface 22 to be communicated therebetween and control the gas return port 62 and the second interface 12 to be communicated therebetween, and the four-way valve 70 may further be configured to control the gas return port 62 and the fourth interface 22 to be communicated therebetween, and control the gas discharge port 61 and the second interface 12 to be communicated therebetween.

For example, in the case where the mobile air conditioner operates in the refrigeration mode, the four-way valve 70 is in a first state, and controls the gas discharge port 61 and the fourth interface 22 to be communicated therebetween and controls the gas return port 62 and the second interface 12 to be communicated therebetween.

In the case where the mobile air conditioner operates in the energy storage mode, the four-way valve 70 is in a second state, and controls the gas return port 62 and the fourth interface 22 to be communicated therebetween and controls the gas discharge port 61 and the second interface 12 to be communicated therebetween.

As a further preferred technical solution of the above embodiment, as shown in FIG. 3, the second refrigerant pipeline may further comprise a second communication branch 52. The second communication branch 52 is in parallel with the branch where the compressor 60 and the four-way valve 70 are located. Moreover, when there is no need to compress the refrigerant to produce work, the second communication branch 52 can be controlled to be opened, and the branch where the compressor 60 and the four-way valve 70 are located is closed. A person skilled in the art may understand that when opened, the second communication branch 52 acts as a bypass structure to bypass the branch where the compressor 60 and the four-way valve 70 are located. In this case, the second communication branch 52 communicates the second interface 12 with the fourth interface 22, which is suitable for the occasions where the refrigerant circulation is driven by siphon or by pumping by a circulating pump or the like. When there is necessity to produce work to the refrigerant, the branch where the compressor 60 and the four-way valve 70 are located is opened, and the second communication branch 52 is closed.

In an embodiment of the present application, as shown in FIG. 4, the second refrigerant pipeline comprises: a compressor 60, a first gas return pipe 81, a second gas return pipe 82, a first gas discharge pipe 83 and a second gas discharge pipe 84.

Specifically, the compressor 60 has a gas return port 62 and a gas discharge port 61. The first gas return pipe 81 is communicated with the gas return port 62 and the fourth interface 22, and a third valve 811 for opening or closing the first gas return pipe 81 is connected to the first gas return pipe 81. The second gas return pipe 82 is communicated with the gas return port 62 and the second interface 12, and a fourth valve 821 for opening or closing the second gas return pipe 82 is connected to the second gas return pipe 82. The first gas discharge pipe 83 is communicated with the gas discharge port 61 and the fourth interface 22, and a fifth valve 831 for opening or closing the first gas discharge pipe 83 is connected to the first gas discharge pipe 83. The second gas discharge pipe 84 is communicated with the gas discharge port 61 and the second interface 12, and a sixth valve 841 for opening or closing the second gas discharge pipe 84 is connected to the second gas discharge pipe 84.

More specifically, the third valve 811 and the sixth valve 841 are in an opened state, and the fourth valve 821 and the fifth valve 831 are in a closed state, thereby forming an energy storage loop (similar to the heating loop of the mobile air conditioner) of the refrigerant. In this case, the mobile air conditioner operates in the energy storage mode. The fourth valve 821 and the fifth valve 831 are in an opened state, and the third valve 811 and the sixth valve 841 are in a closed state, thereby forming a refrigeration loop of the refrigerant. In this case, the mobile air conditioner operates in the refrigeration mode.

In any of the above embodiments, optionally, the compressor 60 is provided with an interface configured to electrically connect the compressor 60 to an external power source. For example, a power plug is provided on the compressor, and the power plug is used for electrical connection with an external power source such as an external power strip.

In any of the above embodiments, optionally, the mobile air conditioner further comprises a battery electrically connected to the compressor 60 and supplying power to the compressor 60, which can further improve the mobility and portability of the product.

In any of the above embodiments, optionally, the second heat exchanger comprises at least one of a coil heat exchanger, a finned tube heat exchanger and a spiral fin heat exchanger.

In any of the above embodiments, optionally, the phase-change energy storage working medium includes water and/or ice. When the name change between solid phase and liquid phase is ignored, it can be generally understood that the phase-change energy storage working medium is ice. In this regard, it should be noted that in view of the problem that may exist in the phase-change energy storage solution, i.e., the relatively low energy storage density and poor thermal conductivity of the phase-change energy storage working medium and the large volume of a phase-change heat exchanger cause mismatch between the refrigerant charge and the normal operation charge of a conventional system, in this technical solution, the phase-change energy storage working medium used is water, or more accurately, ice, and phase-change heat storage is achieved by switching between solid phase and liquid phase of water. Ice has a higher cold storage density (about 330 kJ/L), which is greater than the energy storage density 220 kJ/L of other phase-change energy storage working mediums. Moreover, during heat exchange, the heat conductivity coefficient of ice is 2.22 W/(m·K) and the heat conductivity coefficient of water is 0.5 W/(m·K), both are higher than the heat conductivity coefficient 0.2 W/(m·K) of the conventional phase-change energy storage working mediums. Therefore, in this technical solution, ice is used as the phase-change energy storage working medium so that the overall size of the phase-change energy storage heat exchange device 20 can be reduced, which can enhance the matching performance with other components of the system, will not increase the moving burden of the mobile air conditioner, and is conducive to ensuring the mobility and flexibility of the mobile air conditioner.

Embodiment 1 (as Shown in FIGS. 1 and 2)

The mobile air conditioner comprises a first heat exchanger 10, a phase-change energy storage heat exchange device 20 (comprising a second heat exchanger and a phase-change energy storage working medium that exchanges heat with the second heat exchanger), a first throttle branch, a second throttle branch, a compressor 60, a four-way valve 70 and a fan 90 for driving air to exchange heat with the first heat exchanger 10. The first heat exchanger 10 has two interfaces for the refrigerant to enter and exit the first heat exchanger 10, namely a first interface 11 and a second interface 12. In the refrigeration mode, the first interface 11 is a refrigerant inlet and the second interface 12 is a refrigerant outlet. In the energy storage mode, the first interface 11 is a refrigerant outlet and the second interface 12 is a refrigerant inlet. The second heat exchanger has two interfaces for the refrigerant to enter and exit the second heat exchanger, namely a third interface 21 and a fourth interface 22. In the refrigeration mode, the fourth interface 22 is a refrigerant inlet and the third interface 21 is a refrigerant outlet. In the energy storage mode, the fourth interface 22 is a refrigerant outlet and the third interface 21 is a refrigerant inlet. The second throttle branch is in communication with the first interface 11 of the first heat exchanger 10 and the third interface 21 of the second heat exchanger. The second throttle branch comprises a second one-way valve 44 that realizes one-way flow from the first interface 11 of the first heat exchanger 10 to the third interface 21 of the second heat exchanger and a second capillary tube 43 for serving the throttling function. The first throttle branch is in communication with the first interface 11 of the first heat exchanger 10 and the third interface 21 of the second heat exchanger. The first throttle branch comprises a first one-way valve 42 that realizes one-way flow from the third interface 21 of the second heat exchanger to the first interface 11 of the first heat exchanger 10 and a first capillary tube 41 for serving the throttling function. Optionally, the length of the first capillary tube 41 is smaller than the length of the second capillary tube 43, so that the pressure drop of the refrigerant after being throttled by the first capillary tube 41 is smaller than the pressure drop of the refrigerant after being throttled by the second capillary tube 43.

The four-way valve 70 comprises four interfaces. Two interfaces are correspondingly connected to the gas return port 62 and the gas discharge port 61 of the compressor 60. The other two interfaces of the four-way valve 70 are correspondingly connected to the fourth interface 22 of the second heat exchanger and the second interface 12 of the first heat exchanger 10. When the mobile air conditioner operates in the refrigeration mode, the four-way valve 70 controls the gas discharge port 61 and the fourth interface 22 of the second heat exchanger to be communicated therebetween, and controls the gas return port 62 and the second interface 12 of the first heat exchanger 10 to be communicated therebetween. When the mobile air conditioner operates in the energy storage mode, the four-way valve 70 controls the gas return port 62 and the fourth interface 22 of the second heat exchanger to be communicated therebetween, and controls the gas discharge port 61 and the second interface 12 of the first heat exchanger 10 to be communicated therebetween.

When the phase-change energy storage working medium is regenerated outdoors (the mobile air conditioner operates in the energy storage mode), taking the case as an example where the phase-change energy storage working medium is ice, as shown in FIG. 2, the compressor 60 compresses the refrigerant to have a high temperature and a high pressure, the four-way valve 70 is switched to a state shown in FIG. 2, the refrigerant discharged from the compressor 60 enters the first heat exchanger 10 and releases heat to the environment in the form of air cooling at the first heat exchanger 10. The refrigerant discharged from the first heat exchanger 10 is throttled and cooled to below 0° C. by the second one-way valve 44 and the second capillary tube 43. At this time, due to the cut-off effect of the first one-way valve 42, no refrigerant circulates in the loop of the first capillary tube 41. The refrigerant throttled by the second capillary tube 43 absorbs heat of ice through the second heat exchanger in the phase-change energy storage heat exchange device 20, so that water in the phase-change energy storage heat exchange device 20 solidifies into ice, realizing the ice storage operation. The refrigerant then flows back to the compressor 60. By this process, ice is made in the phase-change energy storage heat exchange device 20. In order to ensure the ice production, a temperature detection unit (such as a temperature sensor) may be placed in the water in the phase-change energy storage heat exchange device 20 to detect the temperature. When the measured temperature reaches −10° C. to −4° C., the controller controls the mobile air conditioner to stop operating in the energy storage mode, i.e., the ice storage operation is completed, and the compressor 60 stops, and the mobile air conditioner enters the heat preservation mode; or if the user needs to use it directly, the compressor 60 does not stop, and the four-way valve 70 is switched to the state shown in FIG. 1 to enter the indoor refrigeration mode. It can be understood that in order to ensure the cold storage capacity, the phase-change energy storage heat exchange device 20 may be tightly insulated when necessary.

When indoor refrigeration is performed (the mobile air conditioner operates in the refrigeration mode), the compressor 60 acts as a gas circulating pump and operates at a very low power, and the four-way valve 70 is switched to the state shown in FIG. 1, the refrigerant flows in a reverse direction relative to the energy storage condition in the entire pipeline system. At this time, the second heat exchanger releases heat to the ice in the phase-change energy storage heat exchange device 20, and the refrigerant condenses into a low-temperature liquid state, and then enters, by the dual action of gravity and pumping of the compressor 60, the first heat exchanger 10 through the first one-way valve 42 and the first capillary tube 41 to absorb heat of the indoor hot air to complete evaporation, thereby achieving the purpose of cooling the indoor air. It is worth noting that since the refrigerant does not need to be deeply throttled at this time, the first capillary tube 41 is shorter than the second capillary tube 43, as long as the first capillary tube 41 can meet the requirement that the refrigerant after throttling drops to a temperature 3° C. to 10° C. lower than the normal room temperature. Of course, the first capillary tube 41 may also be replaced by an expansion valve, as long as the opening degree of the expansion valve is controlled to change with the current room temperature, so that the refrigerant after being throttled by the expansion valve drops to a temperature 3° C. to 10° C. lower than the current room temperature. When the first detection temperature unit in the phase-change energy storage heat exchange device 20 detects that the temperature of ice or water in the phase-change energy storage heat exchange device 20 rises to 8° C. to 20° C., the refrigeration operation mode is stopped, and the user is reminded that the ice storage operation needs to be performed again.

Embodiment 2 (as Shown in FIG. 3)

Different from the above Embodiment 1, the mobile air conditioner in this embodiment further comprises a first communication branch 51 and a second communication branch 52. The first communication branch 51 communicates the third interface 21 of the second heat exchanger with the first interface 11 of the first heat exchanger 10, and the second communication branch 52 communicates the second interface 12 of the first heat exchanger 10 with the fourth interface 22 of the second heat exchanger. In this way, when the first communication branch 51 is opened, the first throttle branch is bypassed by the first communication branch 51, and the refrigerant preferentially flows between the third interface 21 of the second heat exchanger and the first interface 11 of the first heat exchanger 10 via the first communication branch 51, and the branch where the four-way valve 70 and the compressor 60 are located is bypassed by the second communication branch 52, and the first communication branch 51, the second communication branch 52, the first heat exchanger 10 and the second heat exchanger form a loop.

The corresponding specific working conditions are: the refrigerant fully exchanges heat with ice through the second heat exchanger in the phase-change energy storage heat exchange device 20, when the refrigerant in the second heat exchanger in the phase-change energy storage heat exchange device 20 drops to a temperature 3° C. to 10° C. lower than the room temperature, the first throttle branch in the above Embodiment 1 may be omitted (controlling the first communication branch 51 to be opened to bypass the first throttle branch), and after being discharged from the second heat exchanger, the refrigerant directly enters the first heat exchanger 10 along the first communication branch 51 to absorb heat and evaporate.

More optionally, the second heat exchanger is designed to be located above the first heat exchanger 10, so that after being condensed into a liquid in the second heat exchanger in the phase-change energy storage heat exchange device 20, the refrigerant may actively settle into the first heat exchanger 10 by gravitational potential energy along the first communication branch 51. In the first heat exchanger 10, the hot gas formed after the refrigerant absorbs heat and evaporates rises and enters the second heat exchanger of the phase-change energy storage heat exchange device 20 to continue to release heat and condense to form a refrigerant cycle, as shown in FIG. 3. Therefore, the position of the phase-change energy storage heat exchange device 20 needs to be slightly higher than the position of the first heat exchanger 10 in the system. The advantage of this technical solution lies in that the operation of the air conditioner does not need to rely on energy-consuming components such as a circulating pump, which saves energy, and can also eliminate the noise problem of the pump.

Embodiment 3 (as Shown in FIG. 4)

Different from the above Embodiment 1, this embodiment does not include the four-way valve 70. The components used to replace the four-way valve 70 are a first gas return pipe 81 and a third valve 811 thereon, a second gas return pipe 82 and a fourth valve 821 thereon, a first gas discharge pipe 83 and a fifth valve 831 thereon, and a second gas discharge pipe 84 and a sixth valve 841 thereon. The compressor 60 has a gas return port 62 and a gas discharge port 61. The first gas return pipe 81 is in communication with the gas return port 62 and the fourth interface 22, and the third valve 811 for opening or closing the first gas return pipe 81 is connected to the first gas return pipe 81. The second gas return pipe 82 is in communication with the gas return port 62 and the second interface 12, and the fourth valve 821 for opening or closing the second gas return pipe 82 is connected to the second gas return pipe 82. The first gas discharge pipe 83 is in communication with the gas discharge port 61 and the fourth interface 22, and the fifth valve 831 for opening or closing the first gas discharge pipe 83 is connected to the first gas discharge pipe 83. The second gas discharge pipe 84 is in communication with the gas discharge port 61 and the second interface 12, and the sixth valve 841 for opening or closing the second gas discharge pipe 84 is connected to the second gas discharge pipe 84.

More specifically, the third valve 811 and the sixth valve 841 are in the opened state, and the fourth valve 821 and the fifth valve 831 are in the closed state, realizing controlling the mobile air conditioner to be switched to the energy storage mode; and the fourth valve 821 and the fifth valve 831 are in the opened state, and the third valve 811 and the sixth valve 841 are in the closed state, realizing controlling the mobile air conditioner to be switched to the refrigeration mode, which has the advantages of simple structure and convenient assembly.

Embodiment 4 (as Shown in FIG. 5)

The mobile air conditioner comprises a first heat exchanger 10, a phase-change energy storage heat exchange device 20 (comprising a second heat exchanger and a phase-change energy storage working medium that exchanges heat with the second heat exchanger), a first communication branch 51, a second communication branch 52 and a fan 90 for driving air to exchange heat with the first heat exchanger 10. The first heat exchanger 10 has two interfaces for the refrigerant to enter and exit the first heat exchanger 10, namely a first interface 11 and a second interface 12. In the refrigeration mode, the first interface 11 is a refrigerant inlet and the second interface 12 is a refrigerant outlet. In the energy storage mode, the first interface 11 is a refrigerant outlet and the second interface 12 is a refrigerant inlet. The second heat exchanger has two interfaces for the refrigerant to enter and exit the second heat exchanger, namely a third interface 21 and a fourth interface 22. In the refrigeration mode, the fourth interface 22 is a refrigerant inlet and the third interface 21 is a refrigerant outlet. In the energy storage mode, the fourth interface 22 is a refrigerant outlet and the third interface 21 is a refrigerant inlet. The first communication branch 51 is in communication with the first interface 11 of the first heat exchanger 10 and the third interface 21 of the second heat exchanger. When the first communication branch 51 is opened, communication from the third interface 21 of the second heat exchanger to the first interface 11 of the first heat exchanger 10 is realized. The second communication branch 52 is in communication with the second interface 12 of the first heat exchanger 10 and the fourth interface 22 of the second heat exchanger, so that the first communication branch 51, the second communication branch 52, the first heat exchanger 10 and the second heat exchanger form a loop.

The corresponding specific working conditions are: the refrigerant fully exchanges heat with ice through the second heat exchanger in the phase-change energy storage heat exchange device 20, when the refrigerant in the second heat exchanger in the phase-change energy storage heat exchange device 20 drops to a temperature 3° C. to 10° C. lower than the room temperature, after being discharged from the second heat exchanger, the refrigerant directly enters the first heat exchanger 10 along the first communication branch 51 to absorb heat and evaporate.

The second heat exchanger is located above the first heat exchanger 10, so that after being condensed into a liquid in the second heat exchanger in the phase-change energy storage heat exchange device 20, the refrigerant may actively settle into the first heat exchanger 10 by gravitational potential energy along the first communication branch 51. In the first heat exchanger 10, the hot gas formed after the refrigerant absorbs heat and evaporates rises and enters the second heat exchanger of the phase-change energy storage heat exchange device 20 to continue to release heat and condense to form a refrigerant cycle, as shown in FIG. 5. Therefore, the position of the phase-change energy storage heat exchange device 20 needs to be slightly higher than the position of the first heat exchanger 10 in the system. The advantage of this technical solution lies in that the operation of the air conditioner does not need to rely on energy-consuming components such as a circulating pump, which saves energy, and can also eliminate the noise problem of the pump.

Of course, according to requirements, a driving component such as a pump for driving the refrigerant to flow may also be connected to the first communication branch 51 and/or the second communication branch 52, to replace the aforementioned feature that the second heat exchanger is located above the first heat exchanger 10.

In the present application, the terms "first", "second", "third" . . . "sixth" used for the purpose of description only, and cannot be understood as indicating or implying relative importance. The term "a plurality of" means two or more, unless otherwise explicitly defined. The terms "mounting", "connected", "connection", "fixing" and the like should be understood in a broad sense, for example, "connection" may be a fixed connection, and may also be a removable connection, or an integral connection; and "connected" may refer to direct connection and may also refer to indirect connection through an intermediary. A person of ordinary skills in the art could understand the specific meaning of the terms in the present application according to specific situations.

In the description of the present application, it should be understood that the orientation or position relationships indicated by the terms "upper", "lower" and the like are the orientation or position relationships based on what is shown in the drawings, are merely for the convenience of describing the present application and simplifying the description, and do not indicate or imply that the device or unit referred to must have a particular direction and is constructed and operated in a specific orientation, and thus cannot be understood as the limitation of the present application.

In the description of the present application, the descriptions of the terms "one embodiment", "some embodiments" and "specific embodiments" and the like mean that specific features, structures, materials or characteristics described in conjunction with the embodiment(s) or example(s) are included in at least one embodiment or example of the present application. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present application, which are not used to limit the present application. For a person skilled in the art, the present application may have various changes and variations. Any modifications, equivalent substitutions, improvements etc. within the spirit and principle of the present application shall all be included in the protection scope of the present application.

What is claimed is:

1. A mobile air conditioner, comprising:
   a first heat exchanger, having a first interface and a second interface for a refrigerant to enter and exit;
   a phase-change energy storage heat exchange device, including a second heat exchanger and a phase-change energy storage working medium, the second heat exchanger and the phase-change energy storage working medium configured to exchange heat therebetween, and the second heat exchanger has a third interface and a fourth interface for the refrigerant to enter and exit;
   a first refrigerant pipeline, connected to the first interface and the third interface;
   a second refrigerant pipeline, connected to the second interface and the fourth interface;
   a temperature detection unit, configured to detect a temperature of the phase-change energy storage working medium, and send out a first signal when detecting that the temperature of the phase-change energy storage working medium rises to a first preset limit; and
   a controller, electrically connected to the temperature detection unit being configured to send out a first instruction in response to the first signal, the first instruction being used for triggering the mobile air conditioner to stop operating in a refrigeration mode, or the controller being configured to send out a second instruction in response to the first signal, the second instruction being used for triggering a reminding device to execute a reminding function.

2. The mobile air conditioner according to claim 1, wherein
   the first refrigerant pipeline includes:
   a first communication branch, communicated with the first interface and the third interface, the first interface being communicated with the third interface when the first communication branch is opened.

3. The mobile air conditioner according to claim 2, wherein
   the first communication branch is opened when a temperature of the refrigerant flowing out of the third interface is lower than a current room temperature and there is a temperature difference of at least 3° C. therebetween.

4. The mobile air conditioner according to claim 1, wherein
   the first refrigerant pipeline includes:
   a first one-way throttle branch, communicated with the first interface and the third interface, and the first one-way throttle branch being configured to throttle the refrigerant from the second heat exchanger and then deliver the refrigerant to the first heat exchanger.

5. The mobile air conditioner according to claim 4, wherein
   the first refrigerant pipeline further includes:
   a second one-way throttle branch, communicated with the first interface and the third interface, and the second one-way throttle branch being configured to throttle the refrigerant from the first heat exchanger and then deliver the refrigerant to the second heat exchanger.

6. The mobile air conditioner according to claim 5, wherein
   the first one-way throttle branch and the second one-way throttle branch are configured to satisfy that a pressure drop after the refrigerant is throttled by the first one-way throttle branch is smaller than a pressure drop after the refrigerant is throttled by the second one-way throttle branch.

7. The mobile air conditioner according to claim 1, wherein
   the first preset limit is from 8° C. to 20° C.

8. The mobile air conditioner according to claim 1, wherein
   the temperature detection unit is configured to send out a second signal when detecting that the temperature of the phase-change energy storage working medium decreases to a second preset limit, and the controller is configured to send out a third instruction in response to the second signal, the third instruction being used for triggering the mobile air conditioner to stop operating in an energy storage mode.

9. The mobile air conditioner according to claim 8, wherein
   the second preset limit is from −10° C. to −4° C.

10. The mobile air conditioner according to claim 2, wherein
    the second refrigerant pipeline includes:
    a second communication branch, communicated with the second interface and the fourth interface, the second heat exchanger being located higher than the first heat exchanger, to enable the refrigerant in the second heat exchanger to be transported by gravity to the first heat exchanger along the first communication branch.

11. The mobile air conditioner according to claim 2, wherein
    the second refrigerant pipeline includes:
    a second communication branch, communicated with the second interface and the fourth interface, at least one of the first communication branch and the second communication branch being connected with a driving member configured to drive the refrigerant to flow.

12. The mobile air conditioner according to claim 1, wherein
    the second refrigerant pipeline includes:
    a compressor, having a gas discharge port and a gas return port; and
    a four-way valve, communicated with the gas discharge port, the gas return port, the second interface and the fourth interface, the four-way valve being configured to control the gas discharge port and the fourth interface to be communicated therebetween and control the gas return port and the second interface to be communicated therebetween, wherein the four-way valve is further configured to control the gas return port and the fourth interface to be communicated therebetween, and control the gas discharge port and the second interface to be communicated therebetween.

13. The mobile air conditioner according to claim 1, wherein the second refrigerant pipeline includes:

a compressor, having a gas return port and a gas discharge port;

a first gas return pipe, communicated with the gas return port and the fourth interface and being connected with a third valve, and the third valve being configured to open or close the first gas return pipe;

a second gas return pipe, communicated with the gas return port and the second interface and being connected with a fourth valve, and the fourth valve being configured to open or close the second gas return pipe;

a first gas discharge pipe, communicated with the gas discharge port and the fourth interface and being connected with a fifth valve, and the fifth valve being configured to open or close the first gas discharge pipe; and a second gas discharge pipe, communicated with the gas discharge port and the second interface and being connected with a sixth valve, and the sixth valve being configured to open or close the second gas discharge pipe.

14. The mobile air conditioner according to claim 12, wherein the compressor is provided with an interface configured to electrically connect the compressor to an external power source.

15. The mobile air conditioner according to claim 12, further comprising:

a battery, electrically connected to the compressor and supplying power to the compressor.

16. The mobile air conditioner according to claim 1, wherein the second heat exchanger includes at least one of a coil heat exchanger, a finned tube heat exchanger and a spiral fin heat exchanger.

17. The mobile air conditioner according to claim 4, wherein the first one-way throttle branch includes at least one of a capillary tube, an electronic expansion valve and a thermostatic expansion valve.

18. The mobile air conditioner according to claim 5, wherein the second one-way throttle branch includes at least one of a capillary tube, an electronic expansion valve and a thermostatic expansion valve.

* * * * *